(12) United States Patent
Solon

(10) Patent No.: US 9,847,627 B2
(45) Date of Patent: Dec. 19, 2017

(54) MODULAR PHOTOVOLTAIC POWER SKID BASE SYSTEM

(71) Applicant: Dean Solon, Gallatin, TN (US)

(72) Inventor: Dean Solon, Gallatin, TN (US)

(73) Assignee: Shoals Technologies Group, LLC, Portland, TN (US)

( * ) Notice: Subject to any disclaimer, the term of this patent is extended or adjusted under 35 U.S.C. 154(b) by 262 days.

(21) Appl. No.: 14/513,135

(22) Filed: Oct. 13, 2014

(65) Prior Publication Data

US 2015/0109083 A1 Apr. 23, 2015

Related U.S. Application Data

(60) Provisional application No. 61/893,178, filed on Oct. 19, 2013.

(51) Int. Cl.
| | |
|---|---|
| *H05K 5/00* | (2006.01) |
| *H02G 1/00* | (2006.01) |
| *H01F 27/06* | (2006.01) |

(52) U.S. Cl.
CPC .............. *H02G 1/00* (2013.01); *H01F 27/06* (2013.01); *Y10T 29/49126* (2015.01)

(58) Field of Classification Search
CPC . H02G 3/08; H02G 3/081; H02G 1/00; H01F 27/06; Y10T 29/49126; H05K 5/00; H05K 5/02; H05K 5/0204; F24J 2/52; F24J 2/5207; F24J 2/5237

USPC ..... 174/97, 50, 535, 542, 559, 561; 220/3.2, 220/3.8, 4.02; 361/600, 601, 602, 603, 361/641; 312/223.1, 223.6, 351.1, 351.7
See application file for complete search history.

(56) References Cited

U.S. PATENT DOCUMENTS

| | | | |
|---|---|---|---|
| 8,455,752 B2 * | 6/2013 | Korman | H02S 20/00 174/51 |
| 8,807,364 B2 * | 8/2014 | Josefiak | F24J 2/5237 174/50 |
| 8,922,972 B2 * | 12/2014 | Korman | F24J 2/4647 361/829 |

* cited by examiner

*Primary Examiner* — Angel R Estrada
(74) *Attorney, Agent, or Firm* — Carla Gannon Law

(57) ABSTRACT

A base is a platform that supports a component off the ground in a solar energy installation. The specific configuration of a base can vary based on the intended component, for example whether it holds a transformer or power component. Multiple bases are mechanically and/or electrically connected to form a system of bases in the field. Proper placement of bases and engagement of those bases is facilitated by mating alignment mechanisms such that one base can be lowered "fit" with another. A method of positioning components includes positioning a base and aligning and lowering a second base alongside the first such that the bases engage.

13 Claims, 26 Drawing Sheets

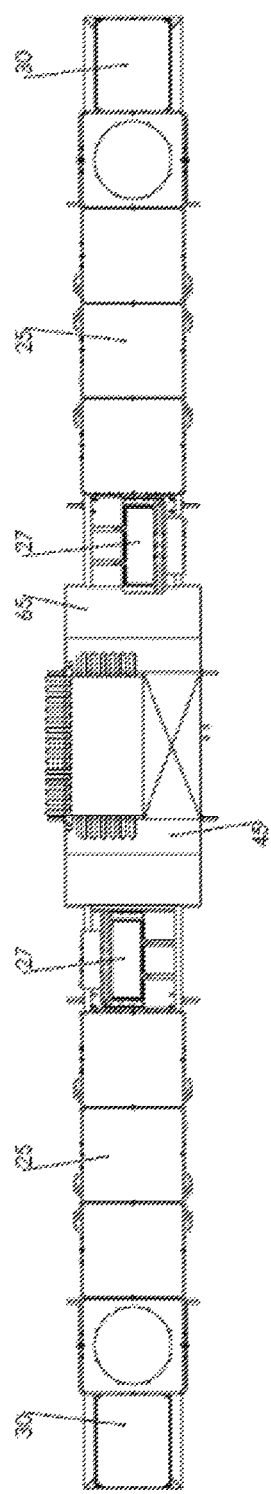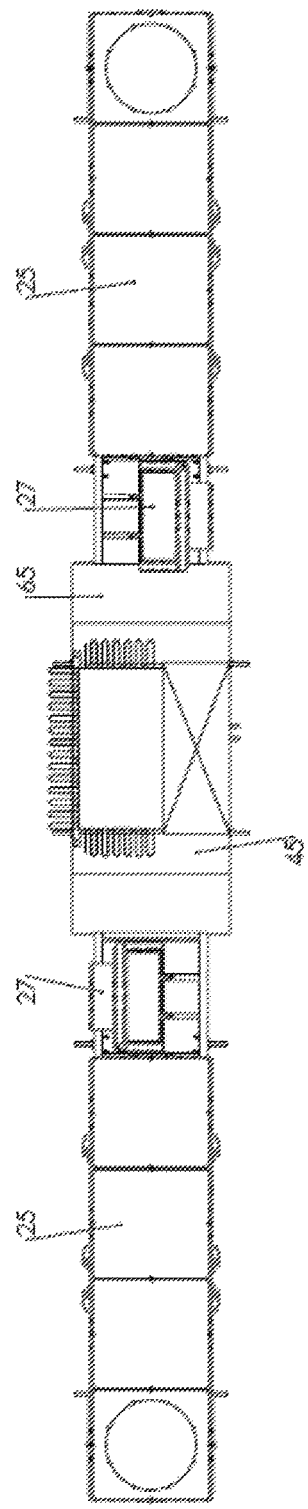

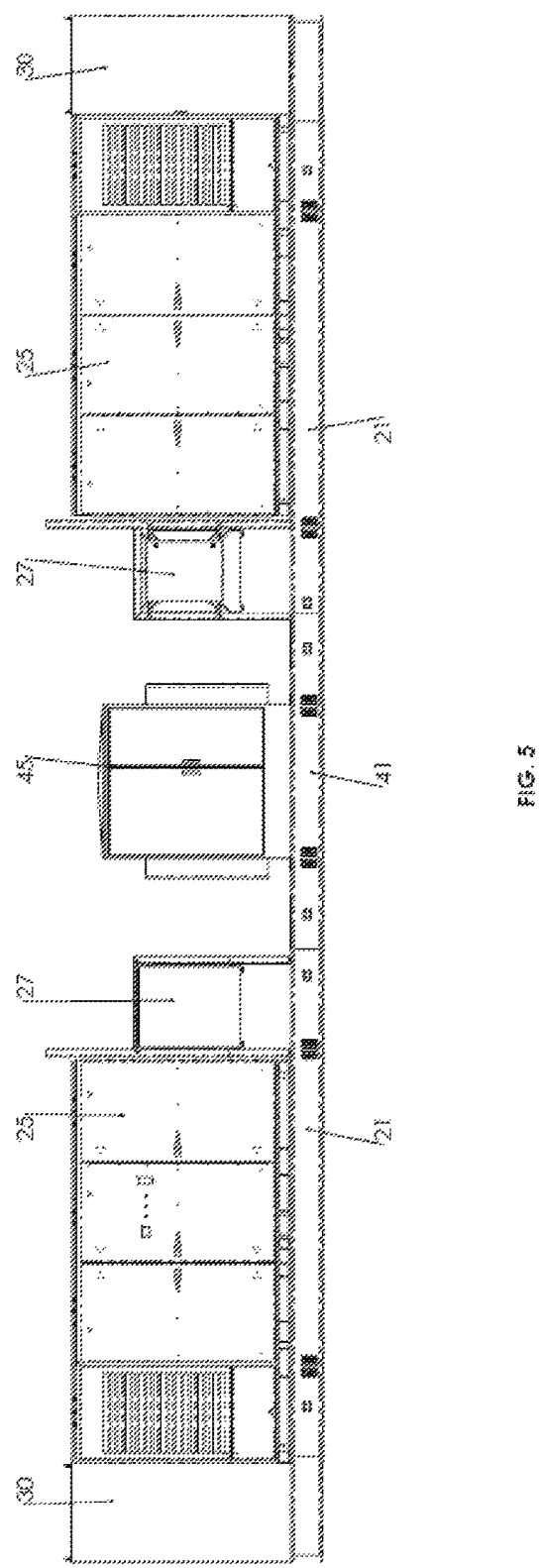

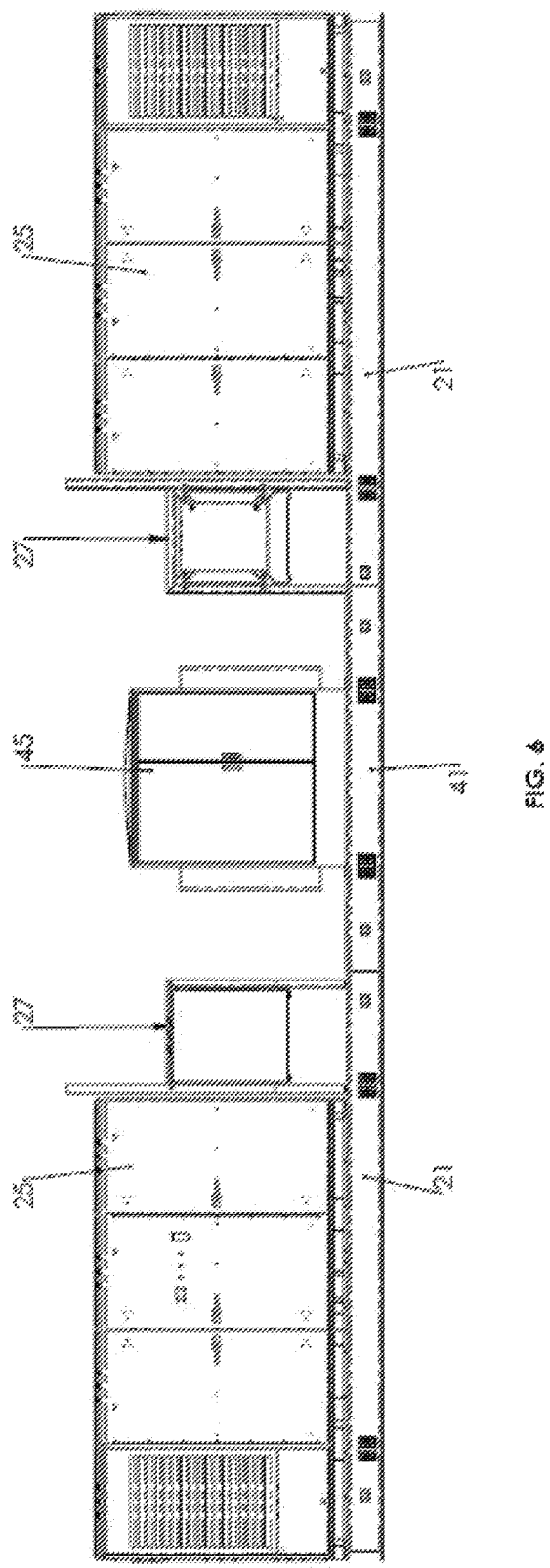

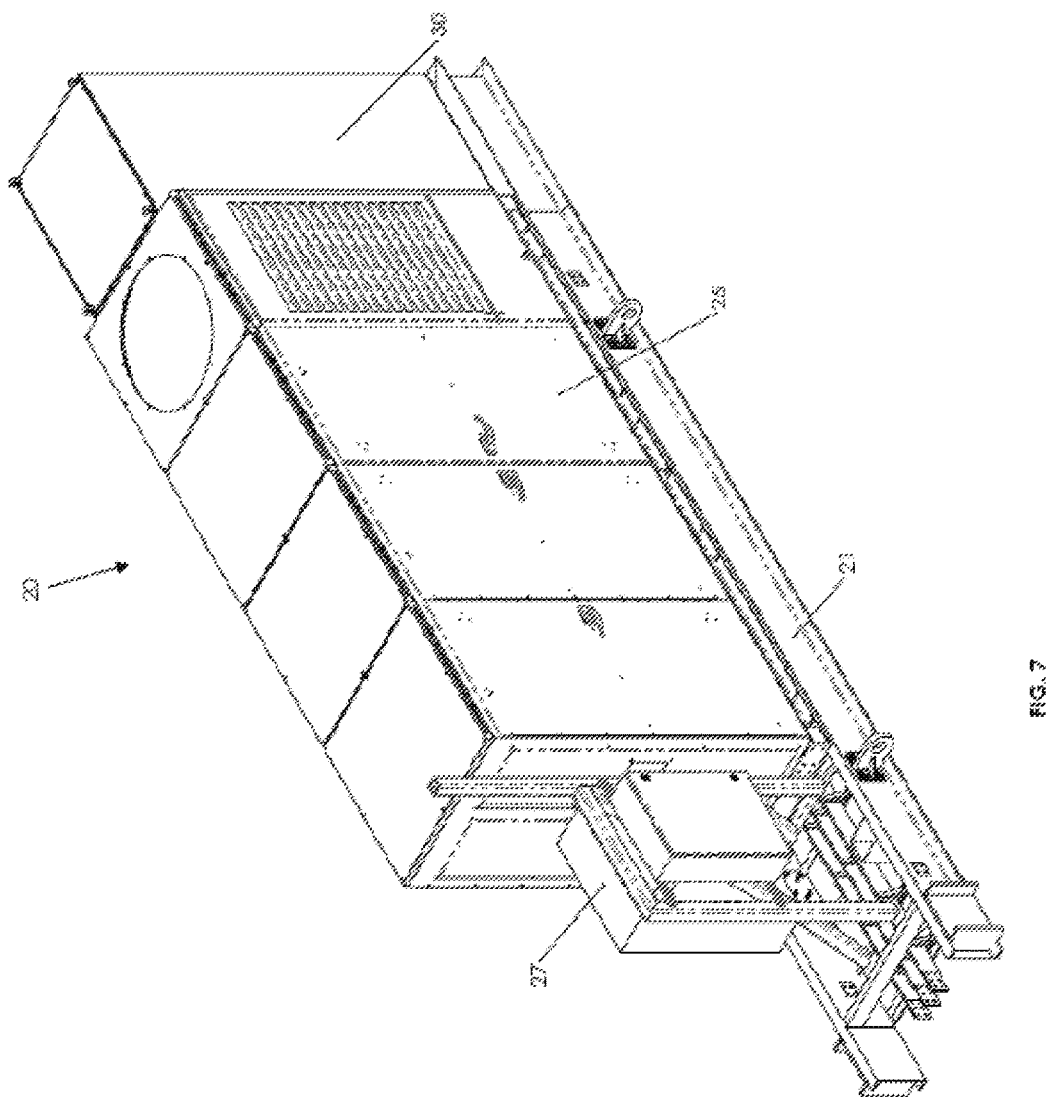

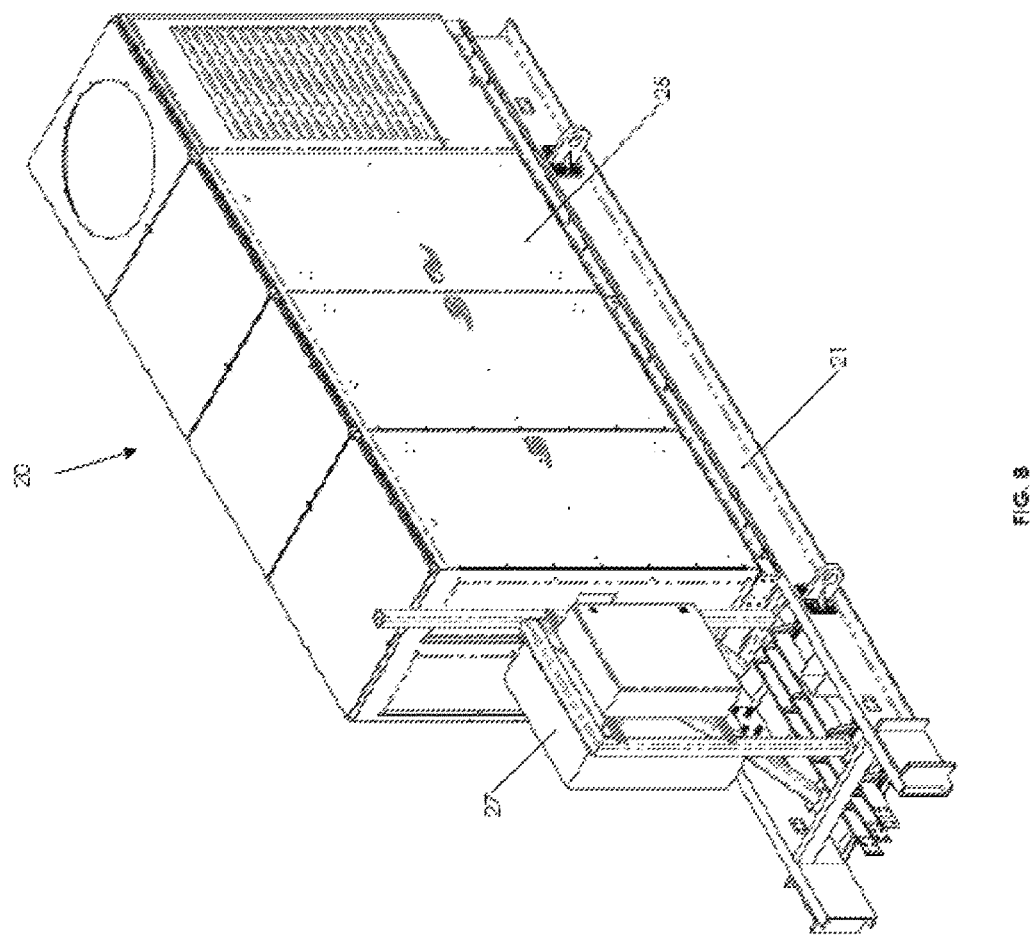

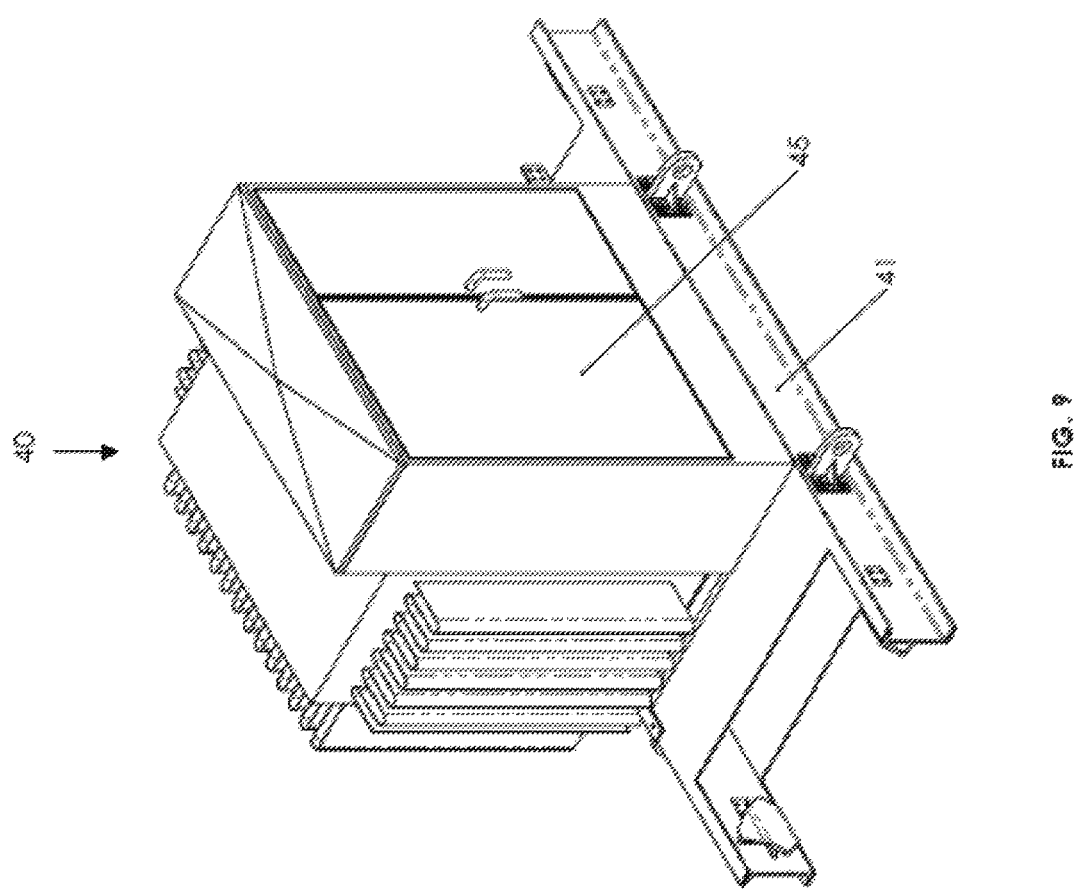

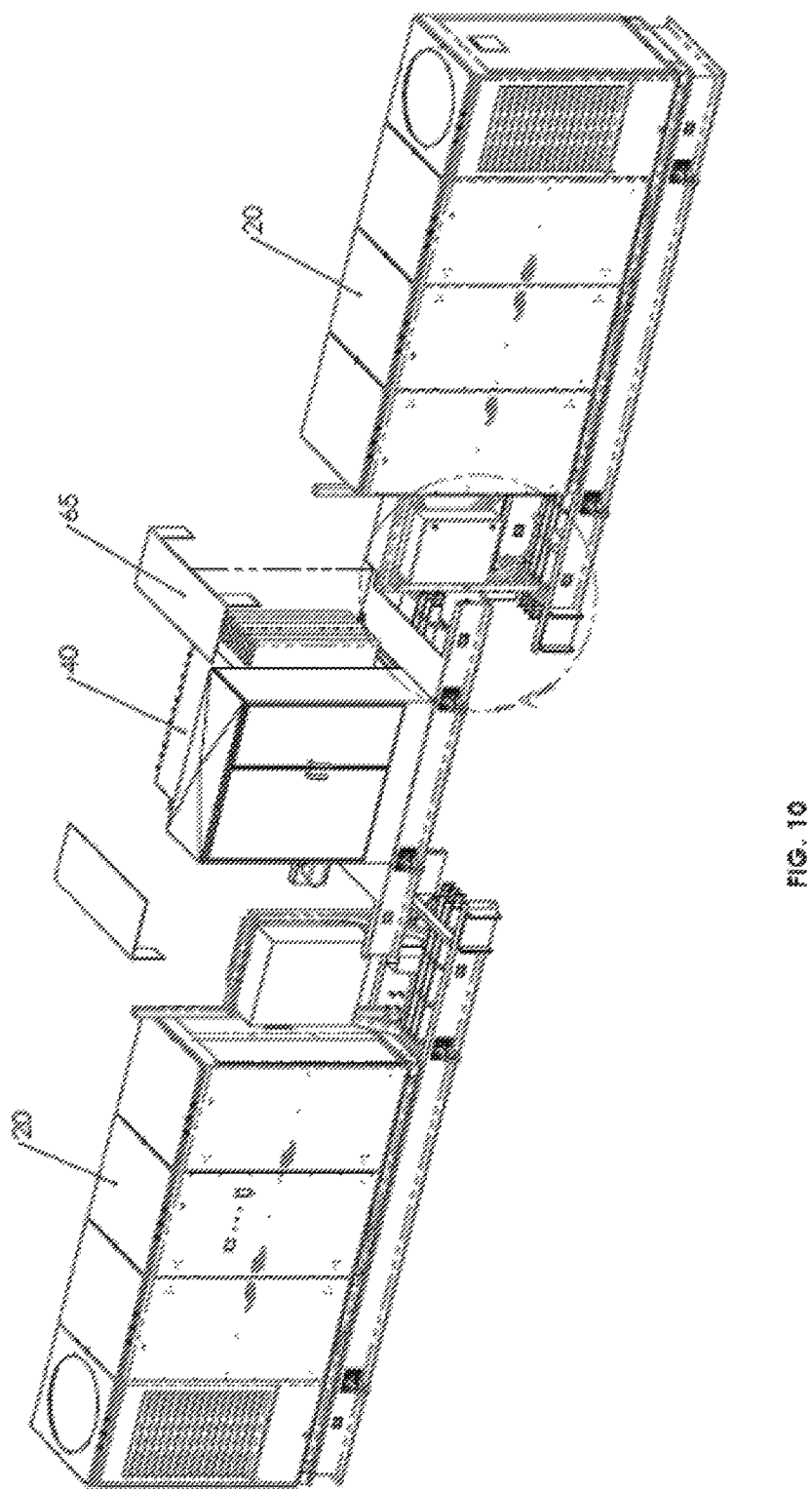

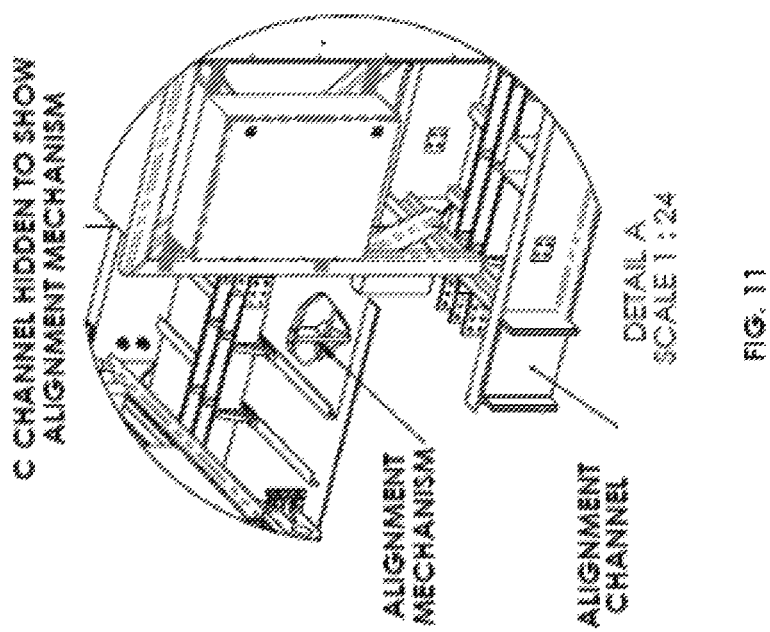

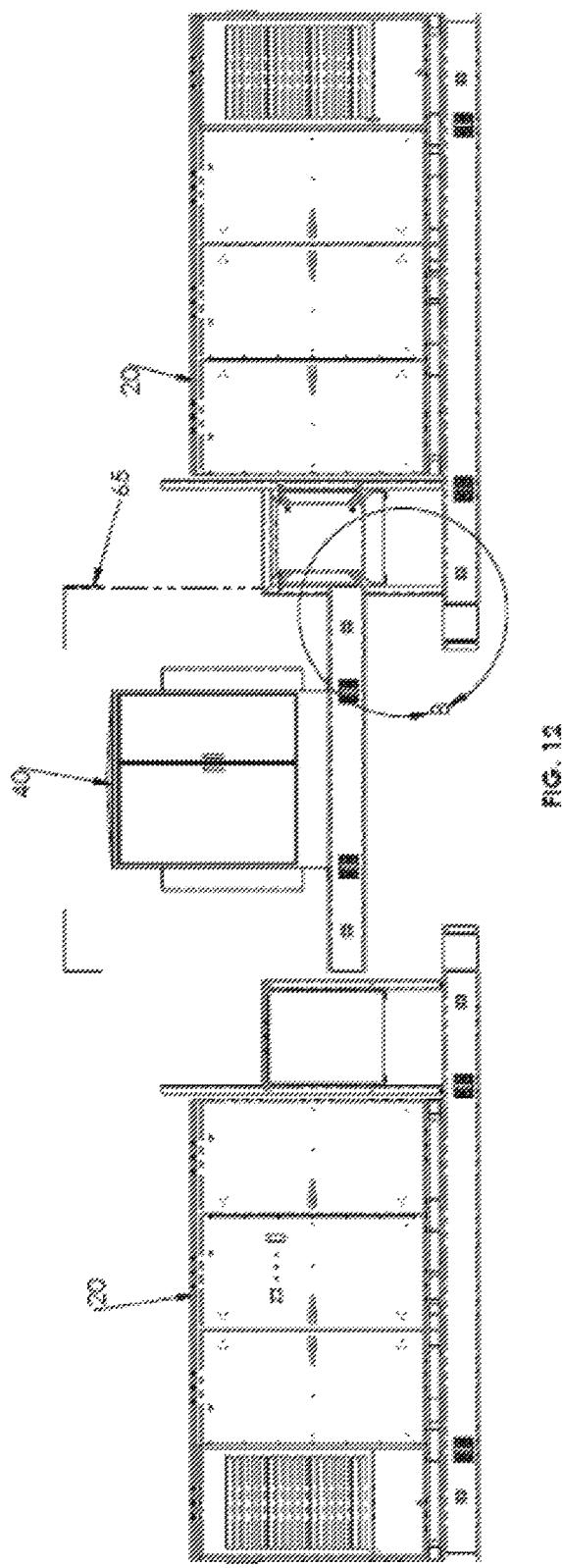

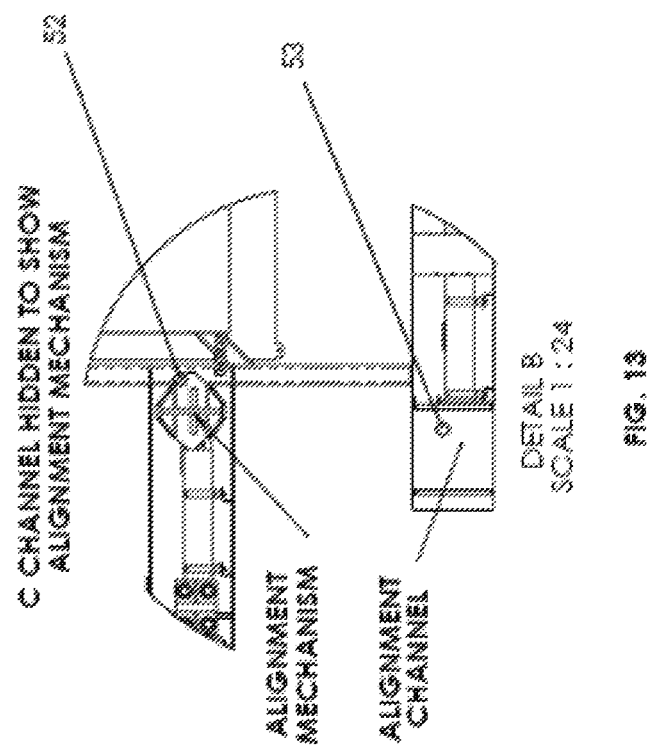

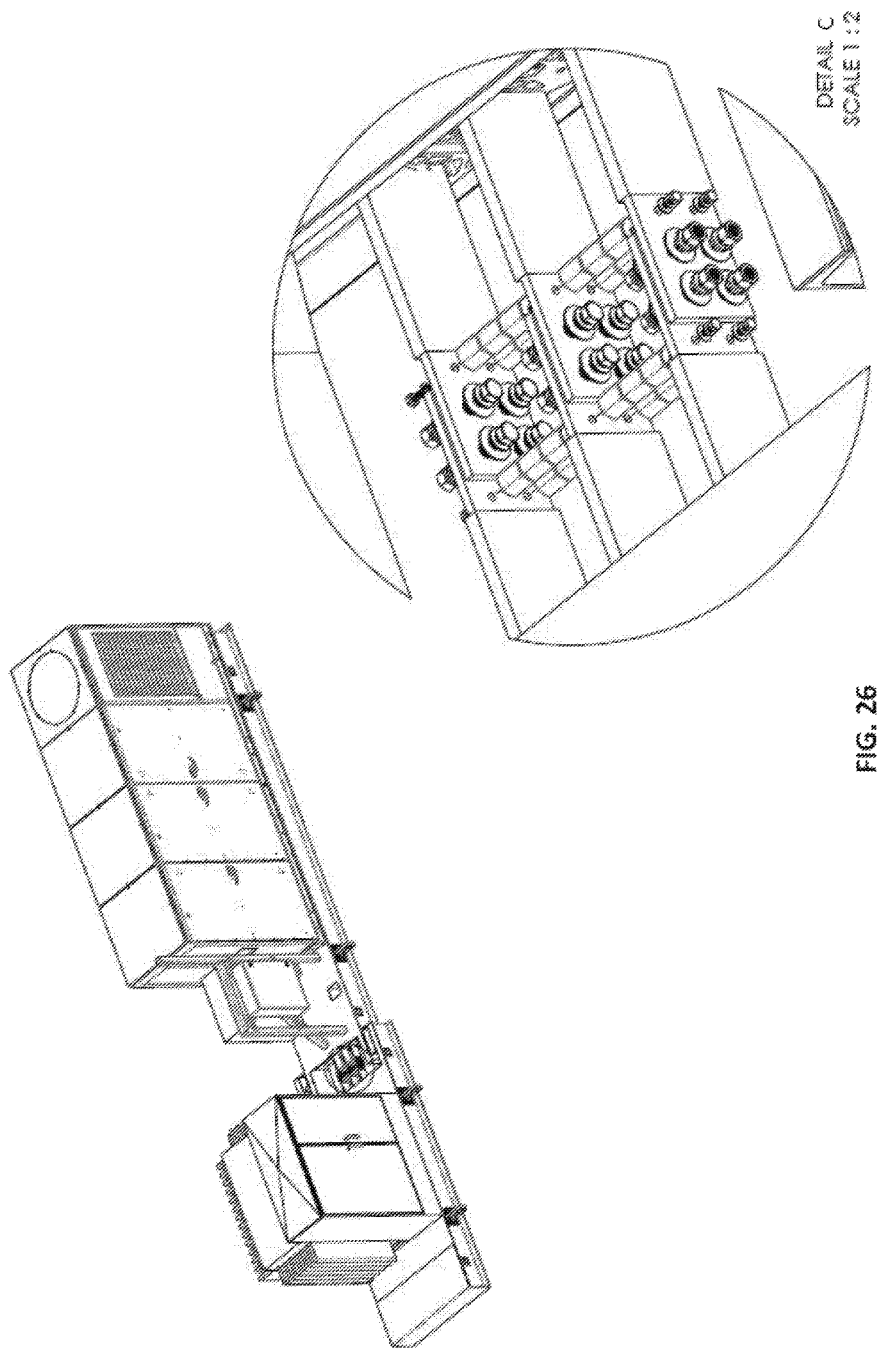

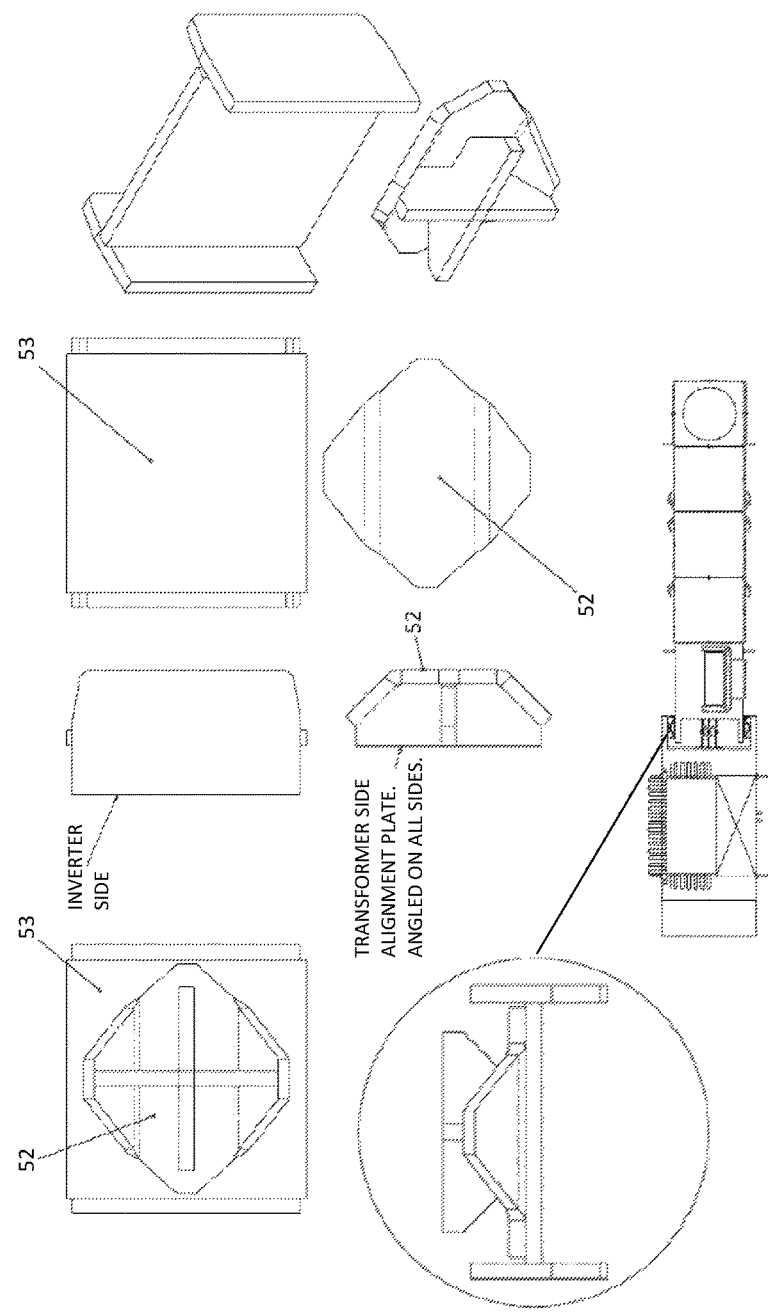

MODULAR PHOTOVOLTAIC POWER SKID BASE SYSTEM

CROSS-REFERENCE TO RELATED APPLICATIONS

This application claims priority from the United States provisional patent application entitled A MODULAR PHOTOVOLTAIC POWER SKID BASE SYSTEM, which was filed on Oct. 19, 2013, and assigned the Ser. No. 61/893,178.

BACKGROUND OF THE INVENTION

Field

The present invention relates to skid bases, and more specifically, to a system of platforms that are mechanically and/or electrically connected for supporting large solar energy components in the field.

Related Art

Solar energy is an increasingly important source of renewable energy that requires certain components such as solar collectors, combiner boxes, recombiner boxes, inverters, transformers and so forth. Although these various components are located outside, it is undesirable to position certain components directly on the ground. More specifically, components directly on the ground are more vulnerable to damage or destruction due to factors such as flooding, animals, uneven surfaces, corrosion and human interference. Accordingly, skid bases are commonly used in the solar energy industry to keep components in a solar field off of the ground. A conventional skid base is typically a very heavy platform having dimension of approximately 12'×30'.

There are many shortcomings with conventional skid bases. For example they are very large and cumbersome, and therefore difficult to manufacture, transport, and install. In addition, in order to lessen the footprint of a skid base there is a tendency to position the components as close to each other as possible. This is problematic when it is necessary to repair or replace a given component whose accessibility is compromised. Conventional skid bases are also limited insofar as they simply act as a platform, so extensive wiring is required in order to electrically couple the various components.

As can be seen, there is a need for a modular photovoltaic power skid base system that keeps certain components in a solar field off the ground. It is desirable that this system is modular, and has bases that are smaller than conventional skid bases so that they are easier to manufacture, transport and install. It is desirable that the individual bases are sized to accommodate specific components, and that the bases, and components on those bases, can easily be mechanically and/or electronically coupled one to another, thereby providing plug-and-play type functionality and adaptability. It is desirable that the bases include alignment structures to ensure sound electrical and mechanical connections. It is desirable that the resulting configuration of modules provides access to the various components. It is desirable that the system can be modified by adding, removing, replacing, and/or moving bases as desired. It is desirable that the system facilitates efficient establishment of solar installations by allowing later-delivered components to be "plugged in" upon arrival.

SUMMARY OF THE INVENTION

A base is a platform formed of parallel rails and a series of cross braces, and supports at least one component off the ground in a solar energy installation. There may be two basic types of bases: power bases that support power-based components such as recombiner boxes, inverters, and auxiliary distribution and control panels; and transformer bases support transformers. In a typical configuration there is one central transformer base with multiple power bases surrounding it. The transformer base is typically wider and shorter than a power base.

Bases are capable of being mechanically and/or electrically connected to other adjacent bases, thereby forming a system wherein bases can be swapped in and out like modules in a larger architecture.

Each base includes alignment mechanisms to facilitate connection to adjacent bases. Most preferred is an embodiment whereby on type of base, for example the transformer base, has alignment protrusions extending inwardly from the rails, and another type of base, for example the power base, has alignment protrusion receivers that extend outwardly from the rails. In this manner the alignment protrusions of the transformer base mate with the alignment protrusion receivers of the power base. It is desirable that this mating not only secures the bases one to another, but also serves to align the bases one to another. This may be accomplished by providing alignment protrusion receivers that are channels having upwardly oriented openings that taper going downwardly. In use, the alignment protrusions of a transformer base being lowered would enter the wide opening of the channel of the alignment protrusion receivers, and be guided into the proper position by tapering walls.

Bases are also outfitted with electrical connections, busses and so forth for electrically coupling to the supported component. Thus, a component isn't merely secured to a base for purposes of moving the component and rearranging components like puzzle pieces. Rather, the base/component combination serves as a module to provide "plug and play" functionality with adjacent bases.

BRIEF DESCRIPTION OF THE DRAWINGS

FIG. 3 is a top view of an embodiment with optional RCB/DCU;

FIG. 4 is a top view of an embodiment without optional RCB/DCU;

FIG. 5 is a front view of an embodiment with optional RCB/DCU;

FIG. 6 is a front view of an embodiment without optional RCB/DCU

FIG. 7 is an isometric view of a power module with optional RCB/DCU;

FIG. 8 is an isometric view of a power module without optional RCB/DCU;

FIG. 9 is an isometric view of a transformer module;

FIG. 10 is an isometric view depicting the transformer module being lowered between two power bases;

FIG. 11 is a detail view of self-aligning mechanisms when transformer base is being lowered between two power bases;

FIG. 12 is a front view depicting the transformer module being lowered between two power bases;

FIG. 13 is a front detail view of self-aligning mechanisms;

FIG. 26 is a detailed, isometric view of the electrical connection; and

FIG. 27 is overall views of mechanical alignment devices.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The following structure numbers apply to the various structures among the various FIGS:

10—Base system;
12—Rail;
14—Cross brace;
16—Rail brace;
20—Power module;
21—Power base;
25—Inverter;
27—Auxiliary Distribution and Control panel;
30—Recombiner box;
40—Transformer module;
41—Transformer base;
45—Transformer;
50—Base junction;
52—Alignment protrusion;
53—Alignment protrusion receiver;
54—Alignment bracket;
60—Transformer output flex bus;
61—Power base bus;
62—Power base output flexible bus;
63—Transformer input flexible bus;
64—Transformer base bus; and
65—Junction cover plate.

Figure 1:
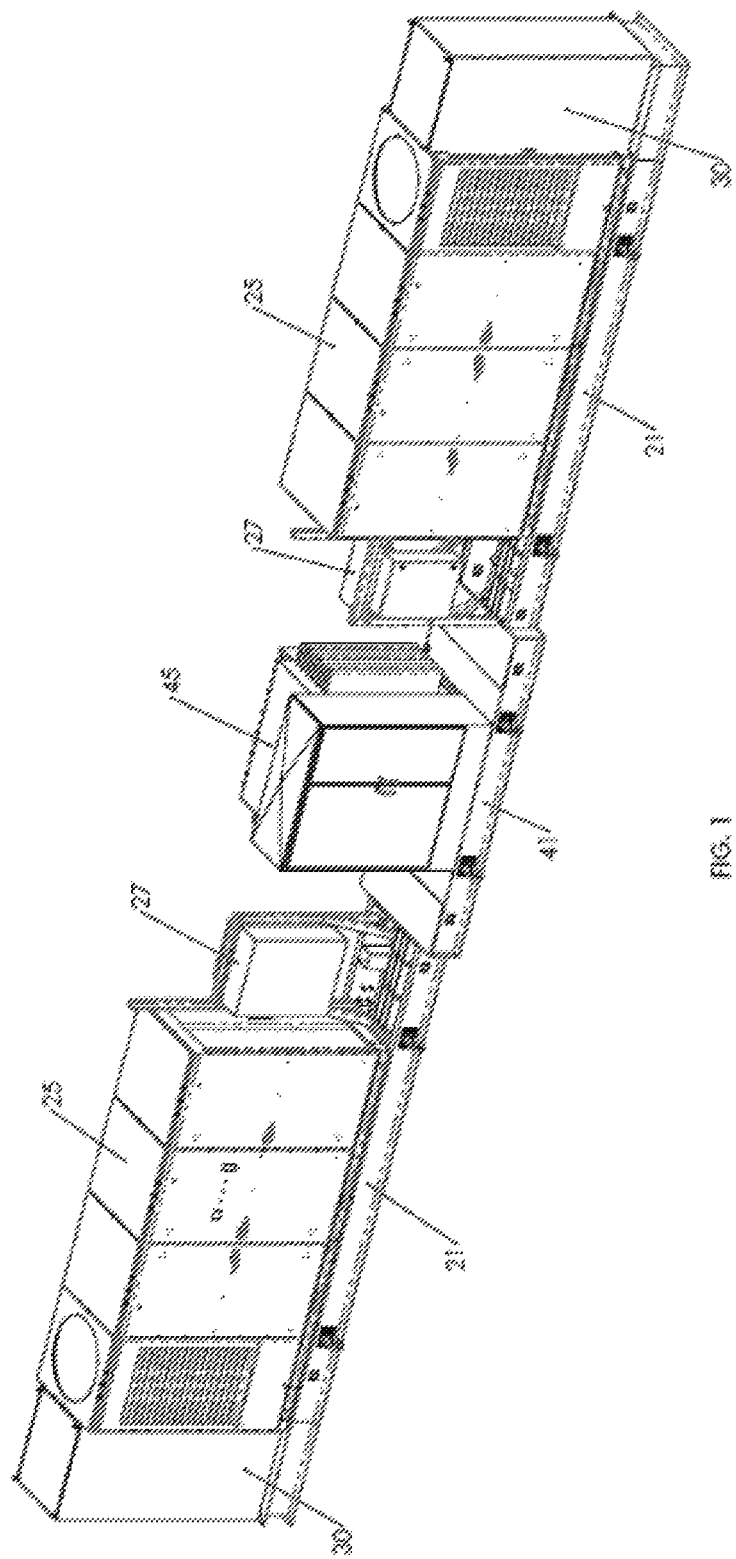
FIG. 1 is a perspective view of an embodiment of the present invention with optional recombiner (RCB)/disconnect unit (DCU)
Figure 2:
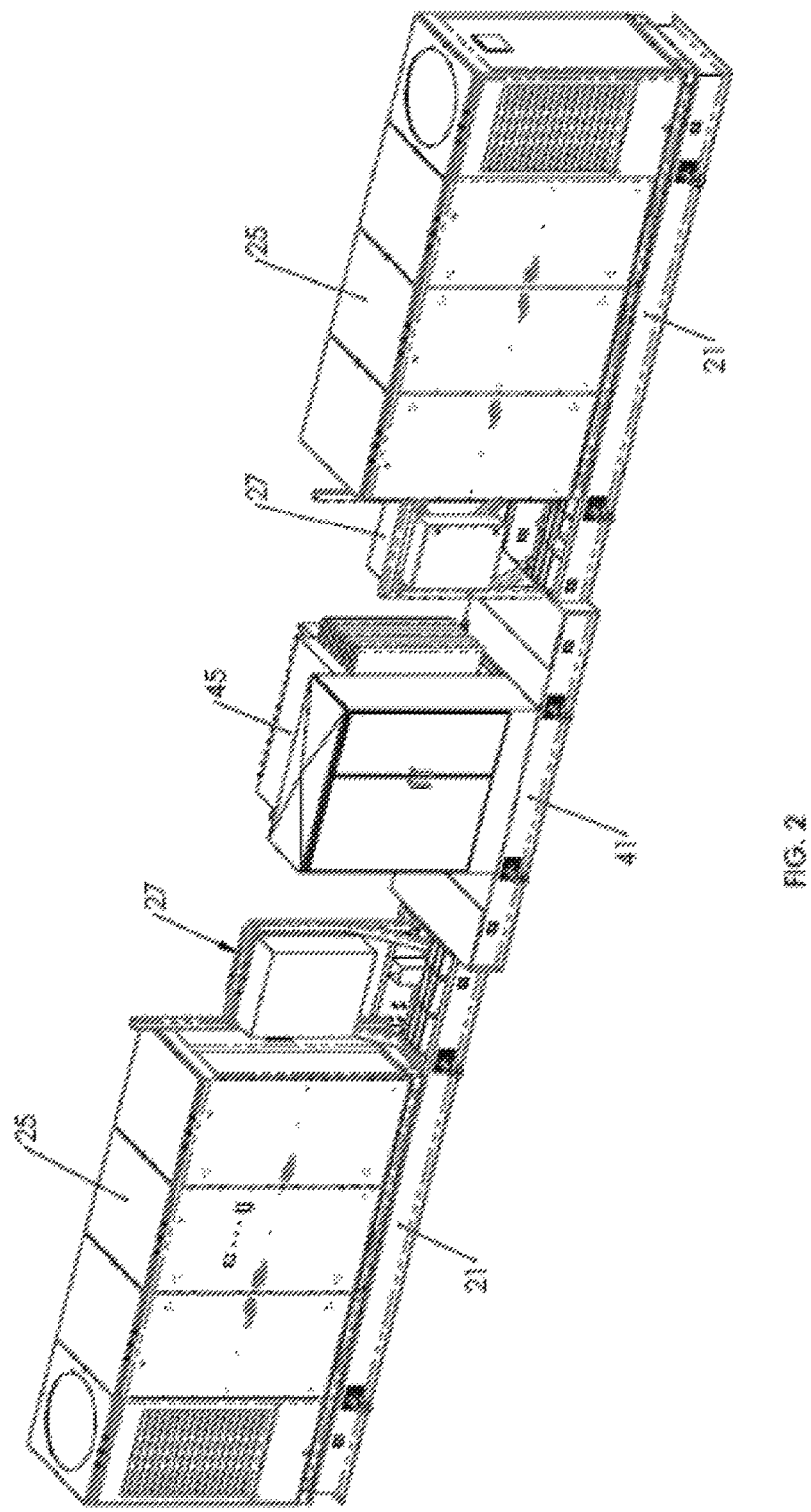
FIG. 2 is a perspective view of an embodiment of the present invention without optional recombiner (RCB)/disconnect unit (DCU)
Figure 14:
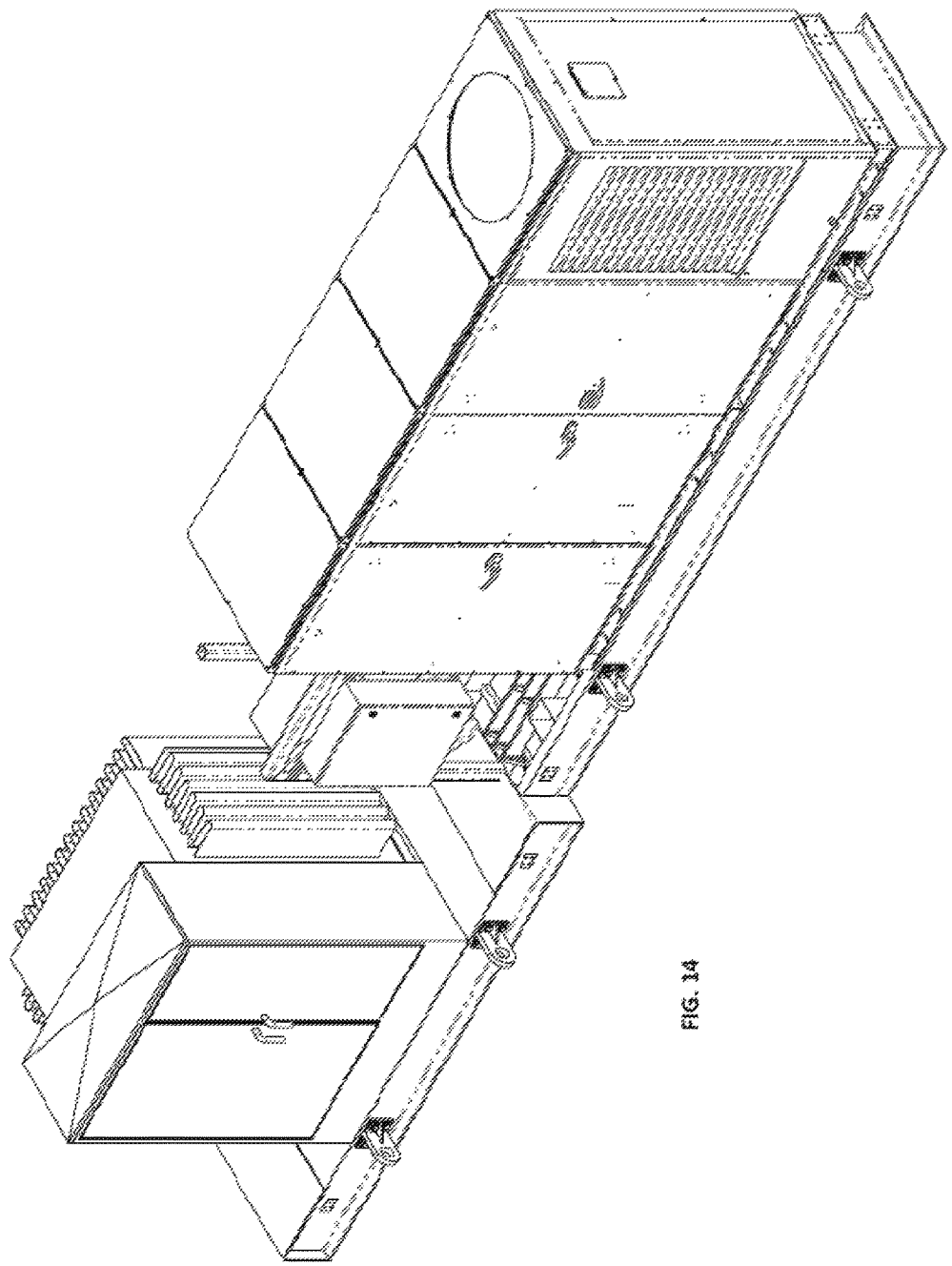
FIG. 14 is an isometric view of a configuration of the present invention that includes one power module and one transformer module.
Figure 15:
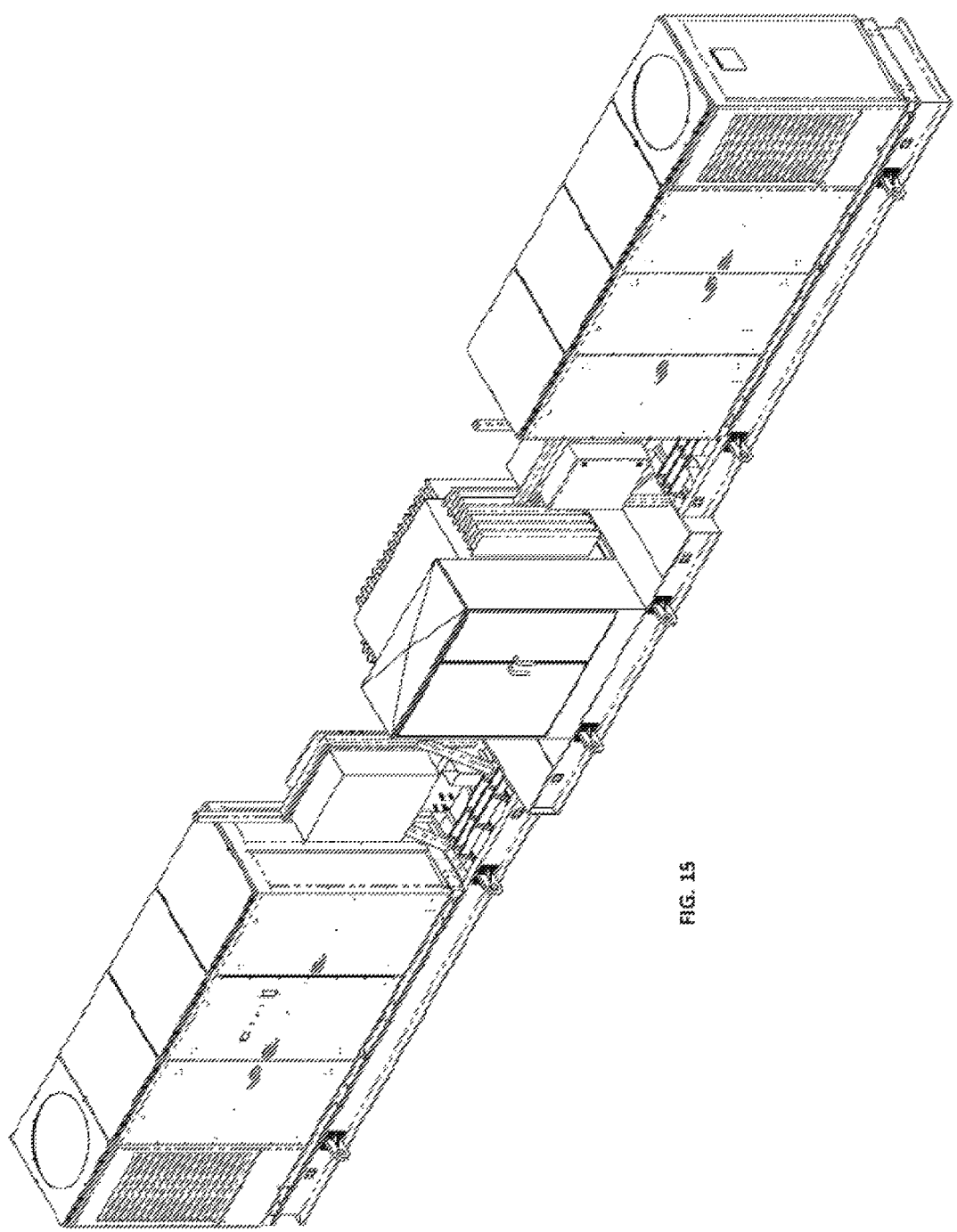
FIG. 15 is an isometric view of a configuration of the present invention that includes two power modules and one transformer module.
Figure 16:
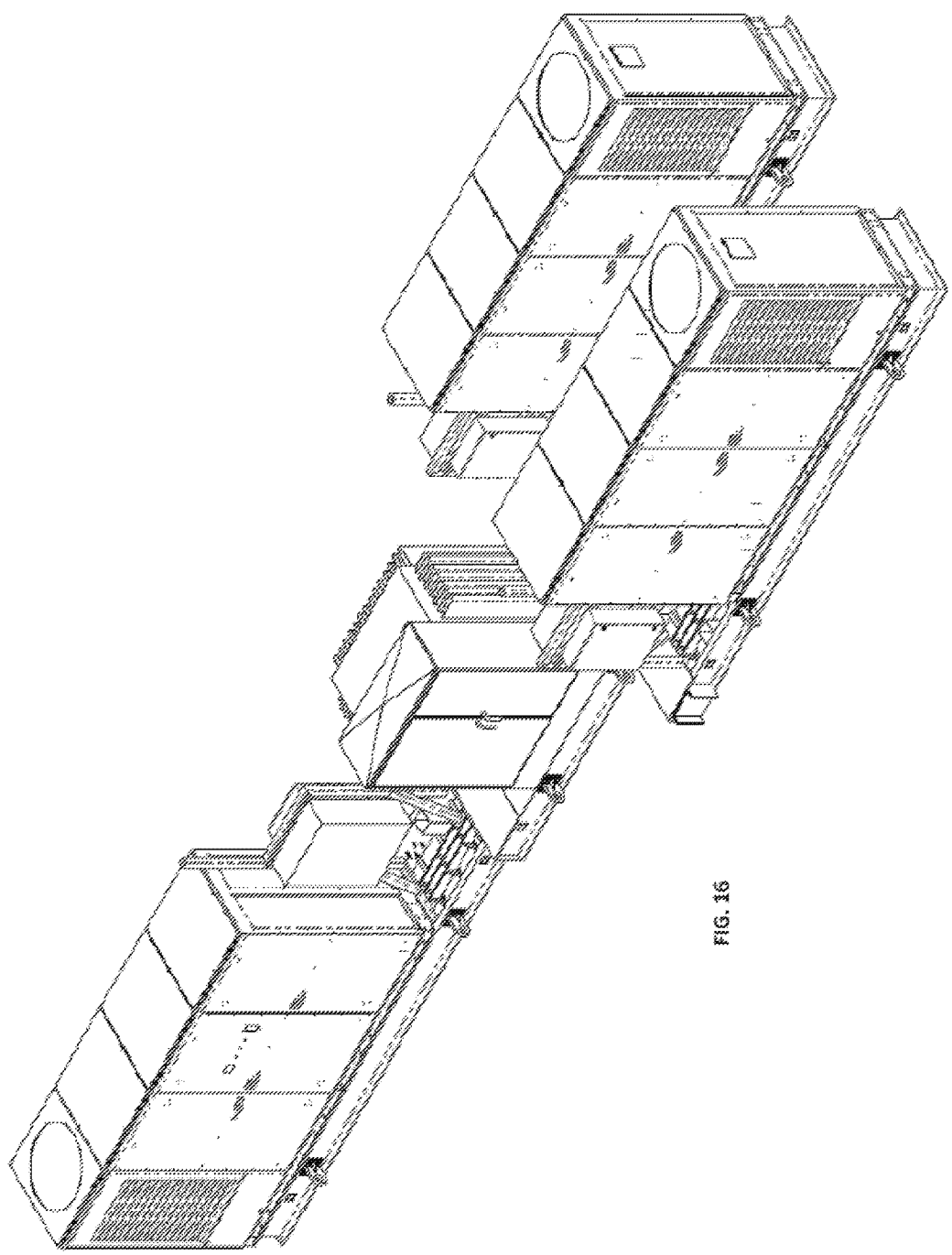
FIG. 16 is an isometric view of a configuration of the present invention that includes three power modules and one transformer module.
Figure 17:
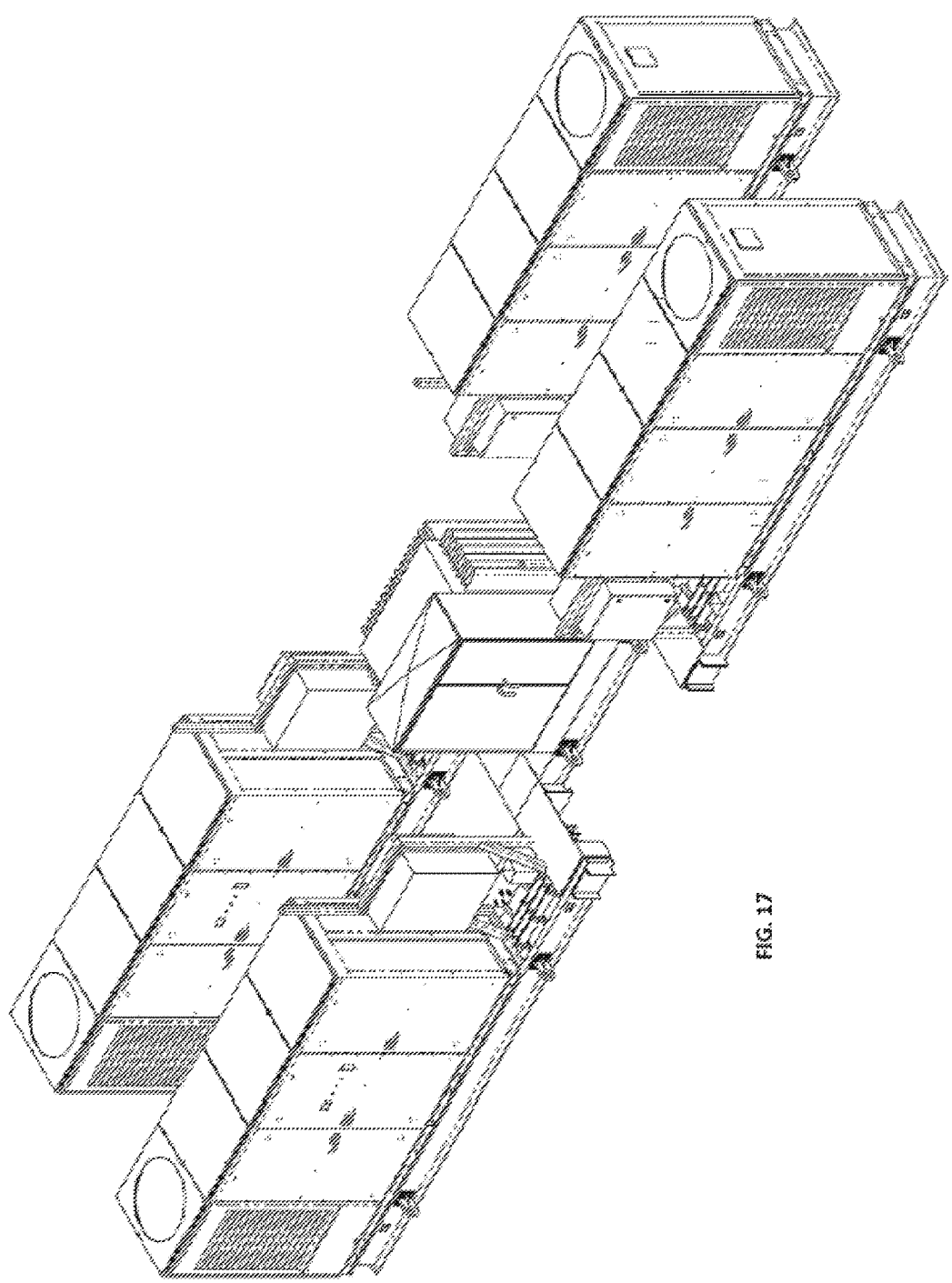
FIG. 17 is an isometric view of a configuration of the present invention that includes four power modules and one transformer module.

Base system 10 includes a plurality of bases each capable of supporting at least one component. As used herein, "components" includes any components used in a photovoltaic system, such as, but not limited to, inverters, SCADA panels, Auxiliary Distribution and Control panels, recombiner boxes, combiner boxes, transformers, controllers, monitoring and reporting equipment, acc AC panels, mandated safety equipment (e.g., fire suppression), and the like. FIG. 1 depicts one configuration, including two power bases 21 each supporting recombiner box 30 and Auxiliary Distribution and Control panel 27, and one transformer base 41 supporting transformer 45. It should be understood that configurations will vary according to the number of components, land lay-out, and so forth, and that the depicted configuration is shown for simplicity. Base system 10 can include any number of power modules 20 and transformer modules 40. For example, whereas FIG. 14 depicts a configuration of base system 10 that includes one power module 20 and one transformer module 40, FIG. 15 depicts a configuration of base system 10 that includes two power modules 20 and one transformer module 40. Further, FIG. 17 depicts a configuration of base system 10 that includes four power modules 20 and one transformer module 40. However, it is also possible to branch out, for example like a tree, star, snowflake, and so forth.

As shown in FIG. 7, power module 20 includes power base 21 as well as supported components of recombiner box 30 and inverter 25, while transformer module 40, as shown in FIG. 9, includes transformer base 41 and transformer 45. Thus, as used herein, "modules" include the component(s) and associated base, as shown within the dotted lines.

Although base sizes can vary, it is desirable that they don't exceed 72 inches in width, so as to be able to be transported by truck without the complications of being a "wide load". In one embodiment power base 21 is approximately 36" wide and 22' long. In one embodiment transformer base 41 is approximately 64" wide and 12' long. However, it should be understood that various dimensions are all within the scope of the present inventions.

Figure 18:
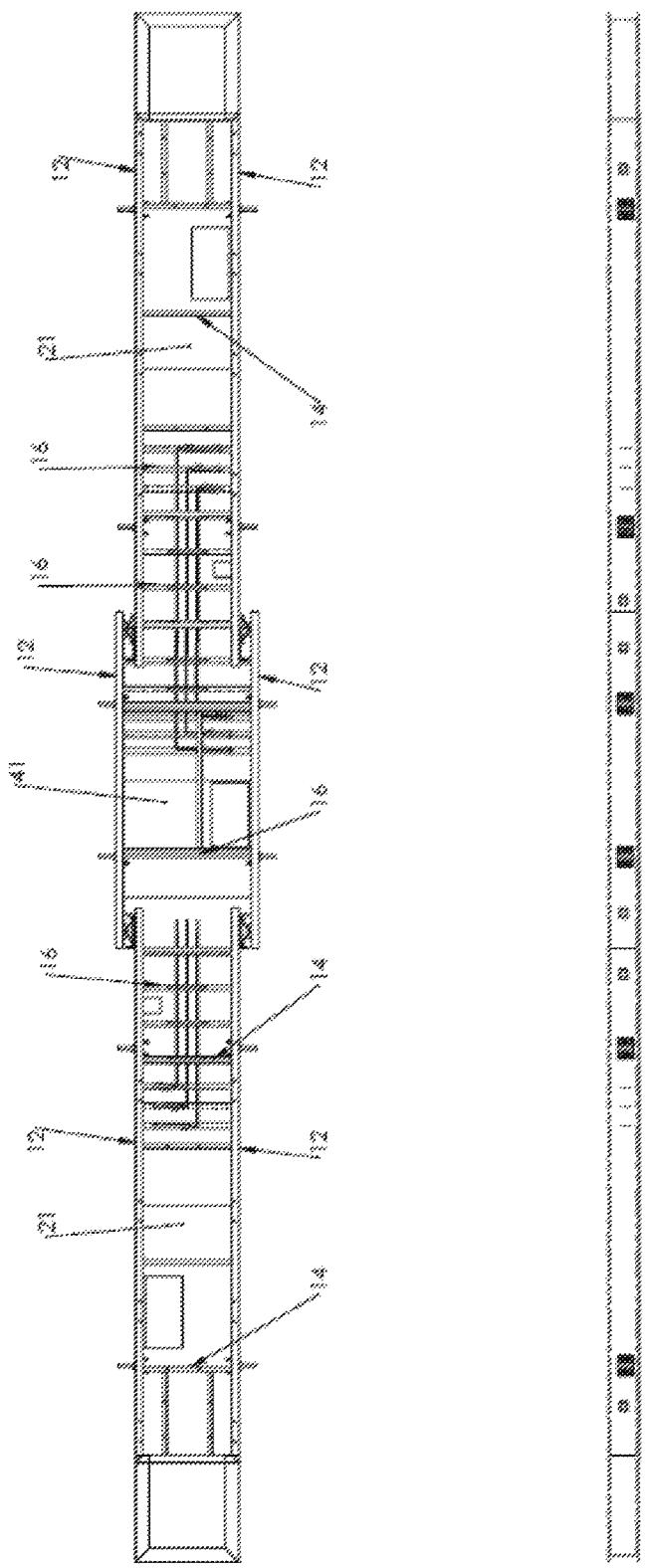
FIG. 18 is a top view of the structure and internal electrical bus system.
Figure 19:
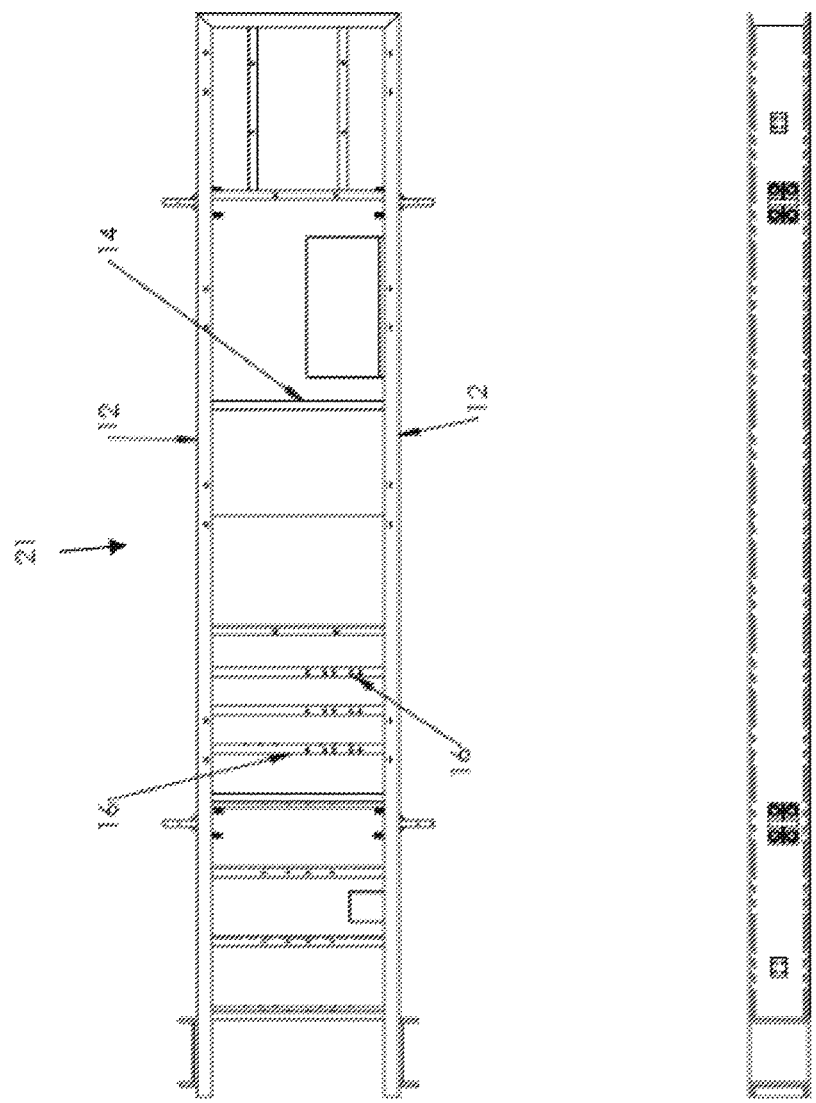
FIG. 19. is a top view of the powerbase structure.
Figure 20:
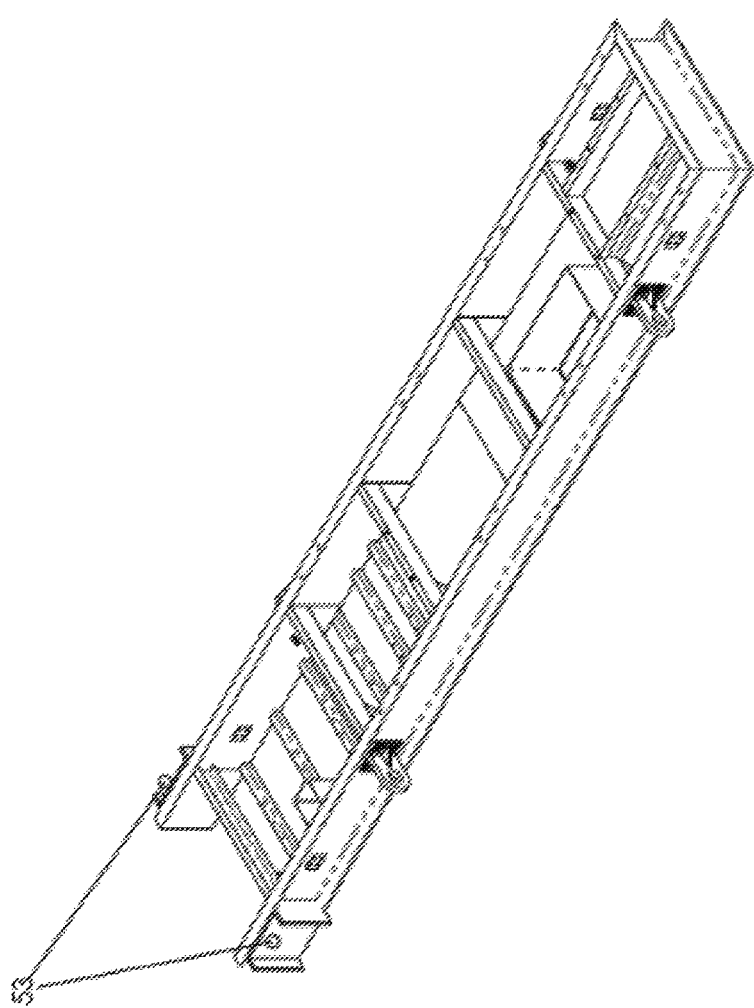
FIG. 20 is an isometric view of the powerbase structure.
Figure 21:
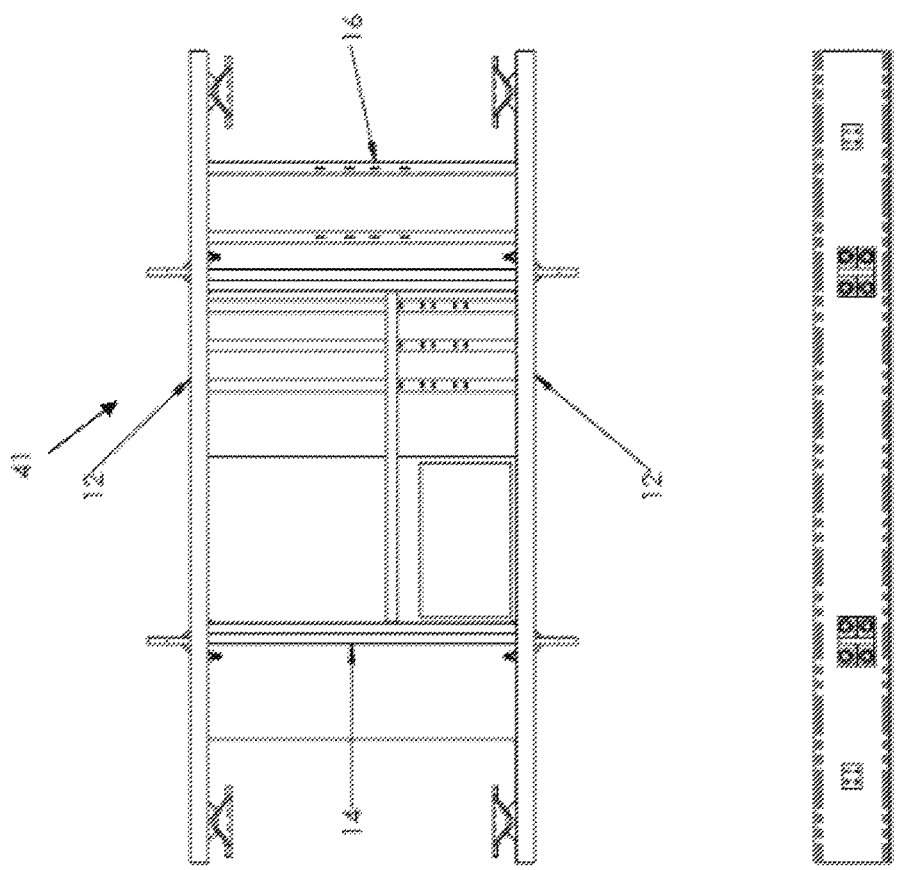
FIG. 21 is a top view of the transformer module structure.
Figure 22:
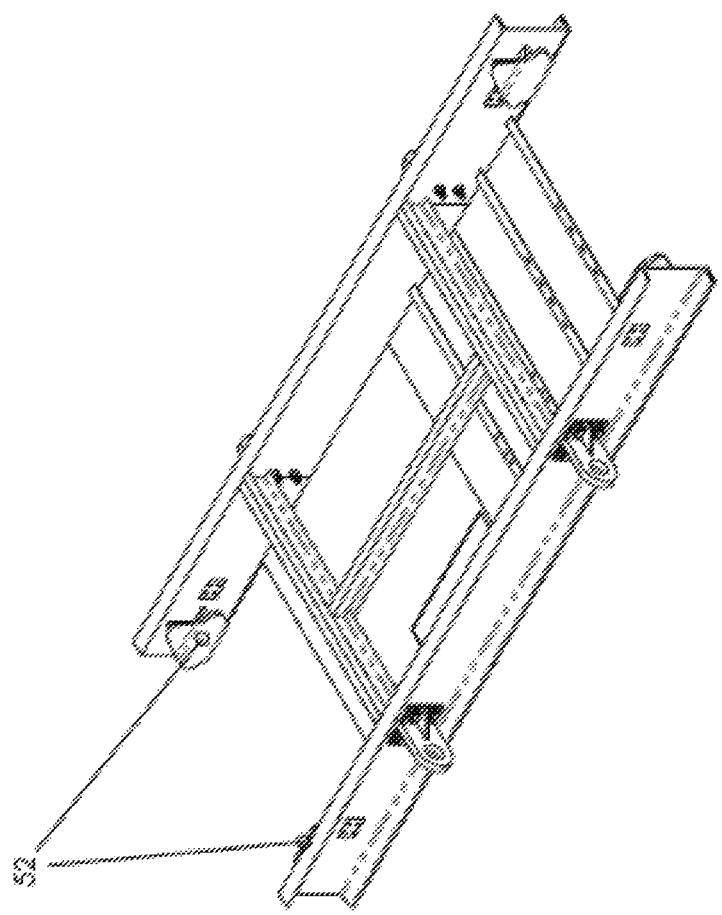
FIG. 22 is an isometric view of the transformer module structure.

As best shown in FIG. 18, FIG. 19 & FIG. 21, bases preferably include two parallel rails 12 which are each reinforced by a plurality of rail braces 16, and connected to each other by a plurality of cross braces 14. The parallel rails 12 and rail braces 16 can be, for example, I-beams. It is preferred that bases are constructed of steel.

One of the benefits of base system 10 is that a solar installation can be built as the various components become available. For example, it is advantageous to be able to "drop in" a transformer at the completion of an installation because transformers are typically delivered after other components. Referring to FIG. 9, transformer base 41 of transformer module 40 is configured to be "dropped in", as depicted in FIG. 10 & FIG. 12. More specifically, transformer base 41 aligns with power bases 21 which are positioned on either side, and is lowered into position.

Figure 23:
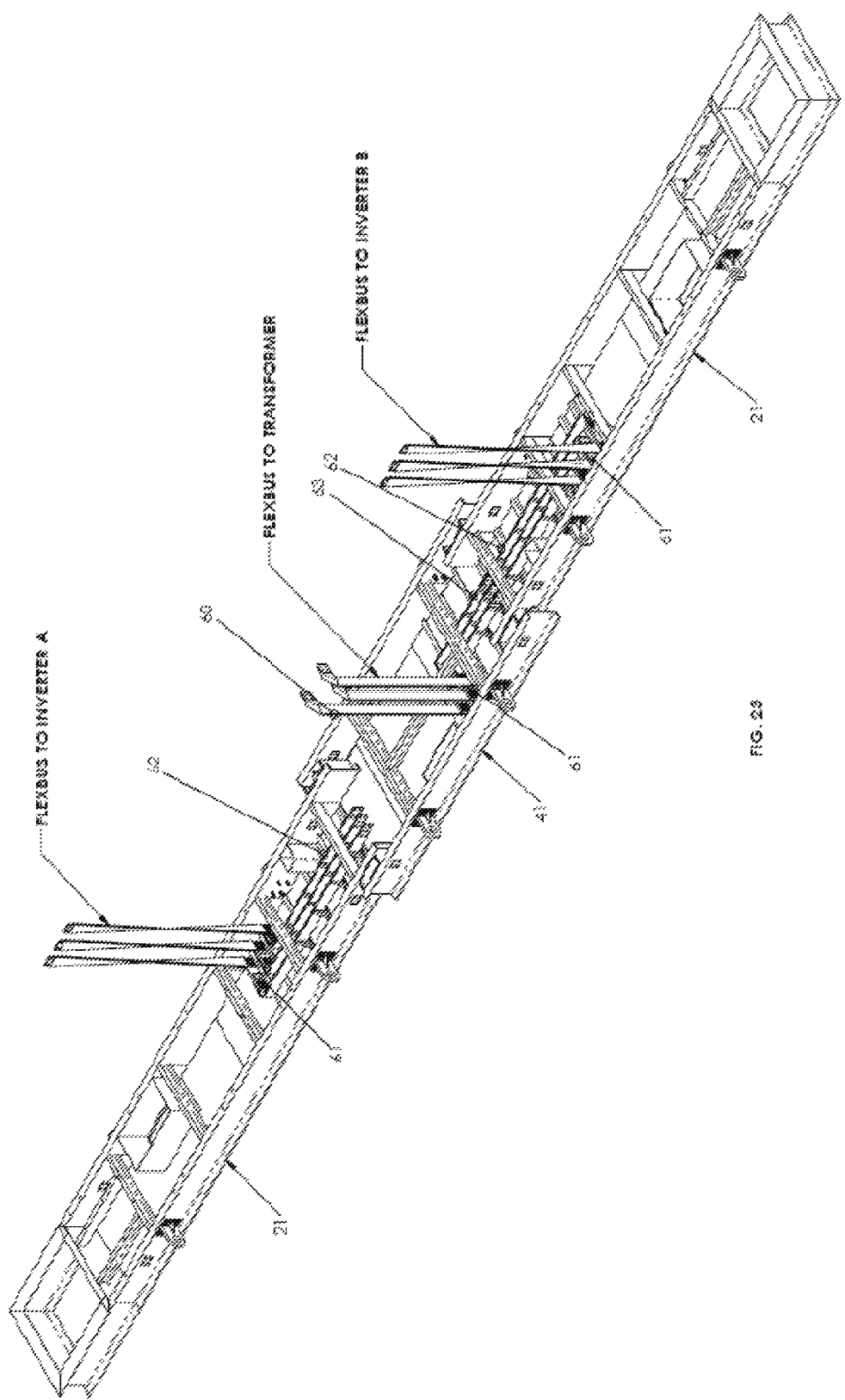
FIG. 23 is an isometric view of a of the structure and electrical bus system showing flexbus method of connecting inverters and transformer.

FIG. 23 depicts the resulting base junction when transformer base 41 has been lowered onto power bases 21, except components aren't shown so that the underlying structure can be seen as well as internal electrical system.

FIG. 14, FIG. 15, FIG. 16 & FIG. 17 depicts the resulting base system 10 configurations when transformer base 41 is fully lowered. FIG. 11 depicts power base 21 including alignment protrusions 52. This is the preferred embodiment because it is easier to fit alignment protrusions 52 into alignment protrusion receivers 53 in the field, particularly based on the triangular shape. However, these alignment structures could be reversed.

Figure 24:
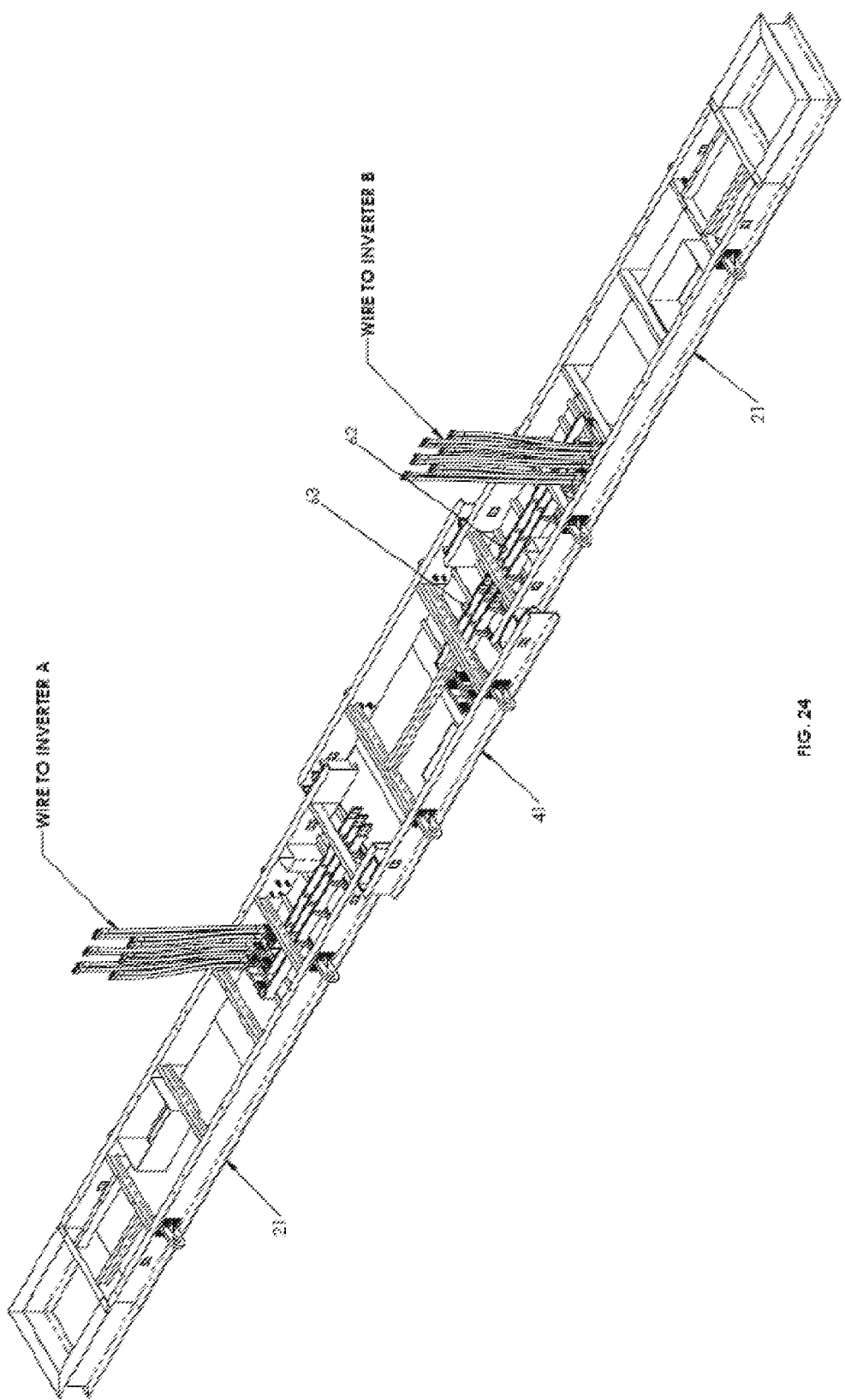
FIG. 24 is an isometric view of a of the structure and electrical bus system showing wire method of connecting inverters and transformer.

Referring now to FIG. 23, power base 21 includes power base bus 61 and power base output flexible bus 62. Referring now to FIG. 23 and FIG. 24, transformer base 41 includes transformer output flex bus 60, transformer input flexible bus 63, and transformer base bus 64.

Power base output flexible bus 62 of power base 21 is designed to receive transformer input flexible bus 63 of transformer base 41. Namely, power base output flexible bus 62 of power base 21 is designed to mechanically and electrically connect to transformer input flexible bus 63 of transformer base 41. Transformer output flex bus 60 of transformer base 41 is designed to receive transformer 45. Namely, transformer output flex bus 60 is designed to mechanically and electrically connect to the inputs and/or outputs of transformer 45.

Figure 25:
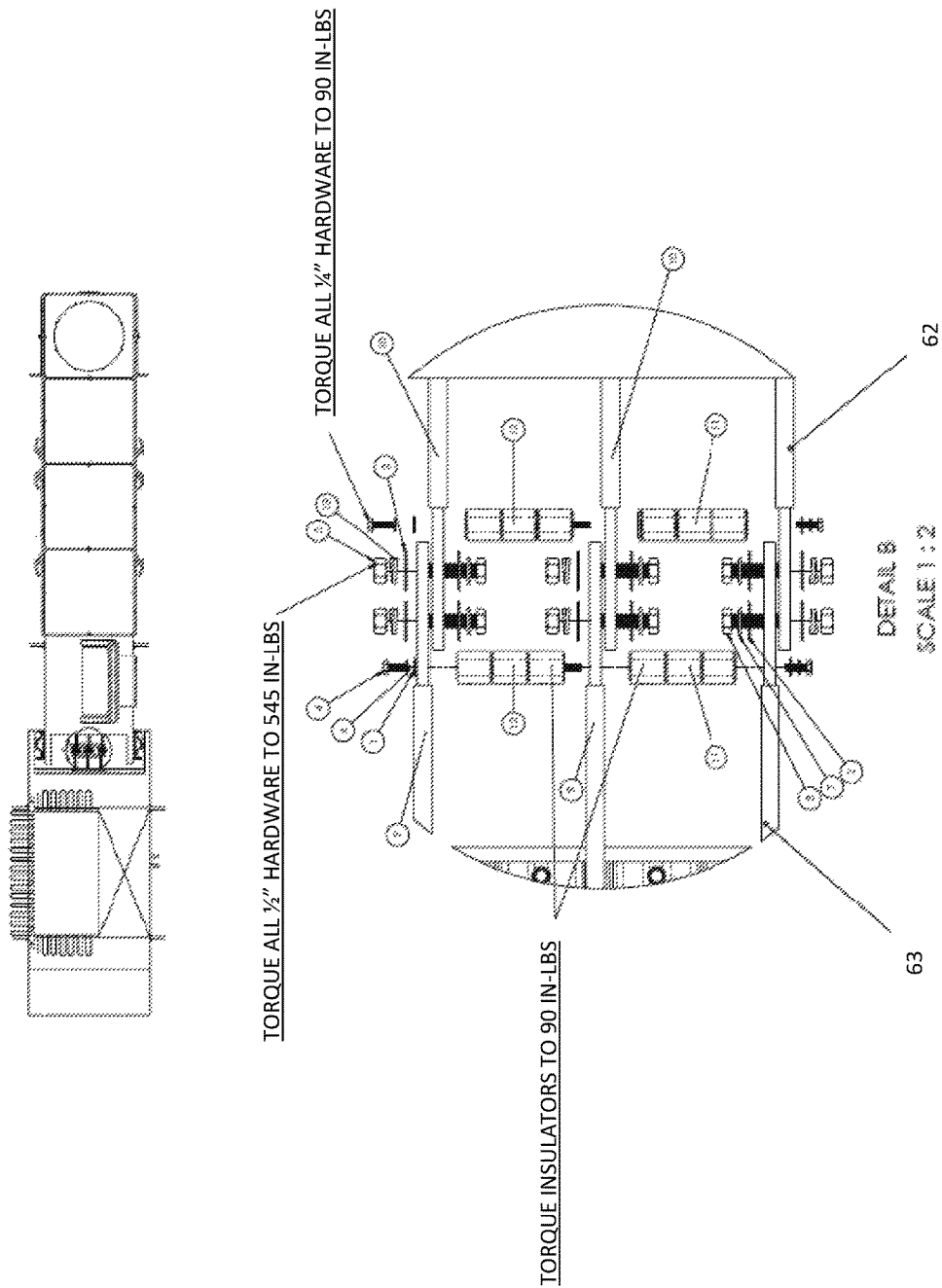
FIG. 25 is a detailed, exploded, top view of the electrical connection.

FIG. 25 is a detailed, exploded, top view of the electrical connection, preferably employing the following parts set forth in TABLE 1:

TABLE 1

Preferred Parts in an Electrical Connection

| ITEM # | PART # | DESCRIPTION | QUANTITY |
|---|---|---|---|
| 1 | FLTW-005 | 1.4" SMALL FLAT WASHER, 18-8 STAINLESS STEEL | 8 |
| 2 | FLTW-014 | 1.2" SMALL FLAT WASHER, 18-8 STAINLESS STEEL | 24 |
| 3 | HXCS-1213-134-SS | ½"-13 × 1"¾" HEX HEAD | 12 |
| 4 | HXCS-1420-034-SS | ¼"-20 × "¾" HEX HEAD | 8 |
| 5 | HXNT-009 | ½"-13 HEX NUT | 12 |
| 6 | K0500-038-S | ¼" 18-8 S/S BELLEVILLE WASHER | 8 |
| 7 | K0928-E-089-S | ½" 18-8 S/S BELLEVILLE WASHER | 12 |
| 8 | DFPH-COVER | BUS CONNECTION COVER FOR DANFOSS QLX POWERHOUSE | 1 |
| 9 | STG.CGP.1000KVA.01 | CG POWER 1000K VA TRANSFORMER POWERSTATION | 1 |
| 10 | STG.DFS.QLX.10100 | DANFOSS QLX INTEGRATED POWERSTATION | 1 |
| 11 | 3_1125-0_1100 | INSULATOR STACK UP WITH (3) 1125-A1's & (0) 1100-A1's | 4 |
| 12 | 3_1125-0_1100-01 | INSULATOR STACK UP WITH (3) 1125-A1's & (0) 1100-A1's WITH 1" SETSCREW ATTACHED | 4 |
| 13 | SPLW-009 | 1.2" SPLIT LOCK WASHER, 18-8 STAINLESS STEEL | 12 |

FIG. 27 depicts alignment structures in greater detail. Referring to FIG. 10, FIG. 11, FIG. 12 and FIG. 13, the alignment that takes place at base junction 50 is facilitated by a series of structures including alignment protrusion 52 which fits into alignment protrusion receiver 53 on an adjoining base.

It should be understood, of course, that the foregoing relates to exemplary embodiments of the invention and that modifications may be made without departing from the spirit and scope of the invention as set forth in the following claims. By way of example, it is possible to position bases of the ground, for example on a concrete pad, in order to further protect components. Ranges set forth herein inherently include the endpoints and all increments, however small, there between. Also, "approximate" and the like shall refer to +/−10% unless otherwise stated.

What is claimed is:

1. A base for supporting at least one component above ground in a solar installation including:
   A) A first rail;
   B) A second rail parallel to said first rail;
   C) A cross brace connecting said first rail to said second rail;
   D) A first vertical alignment channel connected to said first rail, said first vertical alignment channel defined by walls that taper inwardly going downward;
   E) A second alignment channel connected to said second rail; and
   F) An electrical bus system for coupling to at least one component, said electrical bus system extending upwardly from between said first rail and said second rail.

2. The base of claim 1 wherein said first vertical alignment channel and said second alignment channel are configured to mate with alignment protrusions.

3. The base of claim 1 wherein said electrical bus system is at least one flexible bus.

4. The base of claim 1 wherein said electrical bus system is at least one wire.

5. A base system for supporting components above ground in a solar installation including:
   A) A transformer base including a first set of parallel rails connected by a first cross brace;
   B) At least two alignment protrusions connected to said first set of parallel rails on opposing rails;
   C) A power base including a second set of parallel rails connected by a second cross brace; and
   D) At least two vertical alignment channels connected to said second set of parallel rails on opposing rails, said vertical alignment channels each defined by walls that taper inwardly going downward, said vertical alignment channels engaged with said alignment protrusions.

6. The base system of claim 5 wherein the distance between said first set of parallel rails is different from the distance between said second set of parallel rails.

7. The base system of claim 6 wherein the distance between said first set of parallel rails is greater than the distance between said second set of parallel rails.

8. The base system of claim 5 wherein said transformer base is electrically coupled to said power base.

9. The base system of claim 5 wherein said alignment protrusions are engaged with said vertical alignment channels by introducing said alignment protrusions into said channels.

10. A method of positioning components in a solar installation including the steps of:
    A) Placing a first base on a solid surface wherein said first base includes two vertical alignment channels each defined by walls that taper inwardly going downward;
    B) Suspending a second base higher than said first base wherein said second base includes two alignment protrusions configured to mate with said two vertical alignment channels;
    C) Aligning said second base relative to said first base to facilitate mating of said two vertical alignment channels with said two alignment protrusions;
    D) Lowering said second base; and
    E) Engaging said two vertical alignment channels with said two alignment protrusions.

11. The method of claim 10 further including the step of securing a component to said first base, said component selected from the group consisting of inverters, SCADA panels, Auxiliary Distribution and Control panels, recombiner boxes, combiner boxes, transformers, controllers, monitoring and reporting equipment, acc AC panels, mandated safety equipment and fire suppression equipment.

12. The method of claim 11 further including the step of securing a component to said second base, said component selected from the group consisting of inverters, SCADA panels, Auxiliary Distribution and Control panels, recombiner boxes, combiner boxes, transformers, controllers, monitoring and reporting equipment, acc AC panels, mandated safety equipment and fire suppression equipment.

13. The method of claim 12 further including the step of electrically coupling the component of said first base to the component of said second base.

\* \* \* \* \*